United States Patent [19]

Soeda et al.

[11] 4,361,248

[45] Nov. 30, 1982

[54] METAL CONTAINER

[75] Inventors: Yuji Soeda; Akio Goto, both of Hatano, Japan

[73] Assignee: Tokico Ltd., Kawasaki, Japan

[21] Appl. No.: 148,490

[22] Filed: May 9, 1980

[30] Foreign Application Priority Data

May 21, 1979 [JP] Japan .................................. 54-62515

[51] Int. Cl.³ ............................................ B65D 51/18
[52] U.S. Cl. ...................................... 220/254; 220/3; 220/266; 53/403
[58] Field of Search ...................... 220/3, 254, 266; 53/403

[56] References Cited

U.S. PATENT DOCUMENTS 1,753,871  4/1930  Schworetzky ............................ 220/3
4,262,472  4/1981  Soeda et al. ............................ 53/403

Primary Examiner—George T. Hall
Attorney, Agent, or Firm—Wenderoth, Lind & Ponack

[57] ABSTRACT

A metal container comprising a sheared portion in a part of the wall thereof, a projecting portion formed adjacent to the sheared portion and outwardly projecting from the wall of the container, the projecting portion having a fractured side surface and the dimension of the projecting portion in the direction transverse to the side surface increasing in the direction outwards of the container, and a gas introducing passage extending along the sheared portion and the fractured side surface and through the wall of the container.

3 Claims, 9 Drawing Figures

METAL CONTAINER

BACKGROUND OF THE INVENTION

This invention relates to a method for filling gas into a metal container such as an oleo-pneumatic shock absorber or a gas spring and to the construction of the metal container.

One prior art method for filling high pressure gas into a metal container consists of forming a small hole in an end wall of the container, filling gas into the container through the small hole, closing the hole by inserting therein a plug and welding the plug to the container. In such case, difficulties are encountered in that it is necessary to remove burrs or the like from the inner edge of the small hole, thereby decreasing the working efficiency, that it is necessary to fabricate the plug separately from the container, thereby increasing the cost for the machining operation, and that it is necessary to control the material of the plug carefully since the plug is formed separately from the container.

SUMMARY OF THE INVENTION

An object of the present invention is to overcome the difficulties aforementioned by providing a novel method for filling pressurized gas into a metal container comprising the steps of forming a sheared portion in a part of the wall of the container, deforming outwardly a wall portion of the container adjacent to the sheared portion so as to form a projecting portion, which projecting portion having a fractured side surface and the dimension of which in the direction transverse to the side surface increases in the direction outwards of the container, thereby forming a gas introducing passage extending along the sheared portion and the fractured side surface, supplying pressurized gas into the container through the gas introducing passage, deforming inwardly the projecting portion by applying thereto a pressing force, and permanently securing the inwardly deformed projection portion to the container by a resistance welding process.

The present invention also provides a metal container having a sheared portion in a part of the wall thereof, a projecting portion formed adjacent to the sheared portion and outwardly projecting from the wall of the container, which projecting portion having a fractured side surface and the dimension of which in the direction transverse to the fractured side surface increases in the direction outwards of the container, and a gas introducing passage defined by the sheared portion and the projecting portion to extend through the wall of the container. The projecting portion effectively acts as a plug for closing the gas introducing passage.

BRIEF DESCRIPTION OF THE DRAWINGS

The present invention will be explained further hereinafter, by way of example, with reference to the accompanying drawings, in which.

DETAILED DESCRIPTION OF THE PREFERRED EMBODIMENTS

Figure 1:
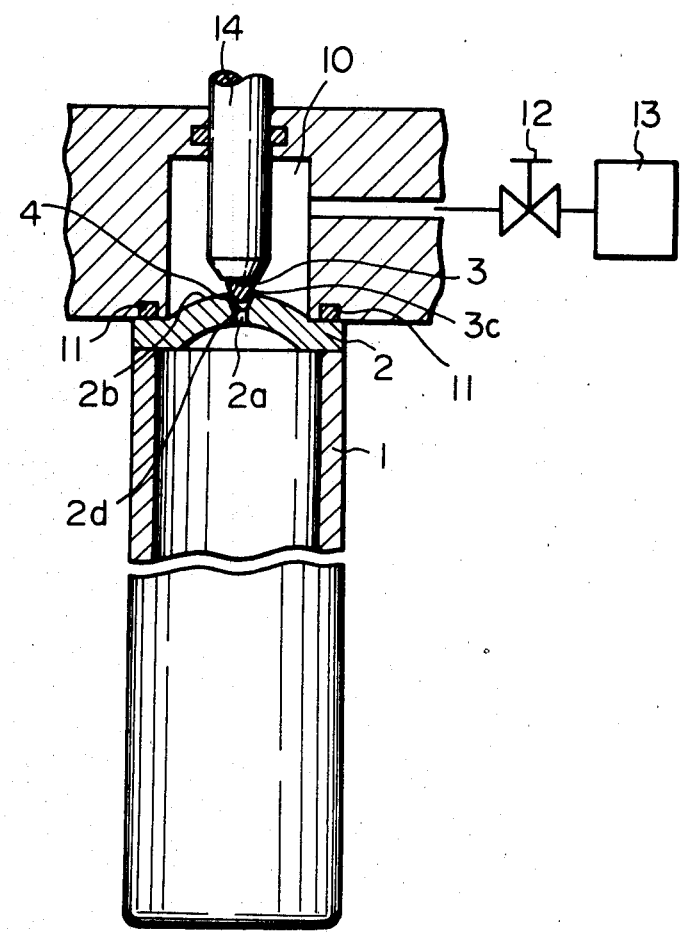
FIG. 1 is a schematic view showing a gas filling method according to the invention.
Figure 2:
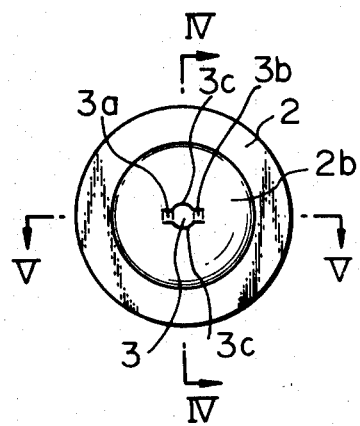
FIG. 2 is a top plan view of the end cap of the container of FIG. 1.
Figure 3:
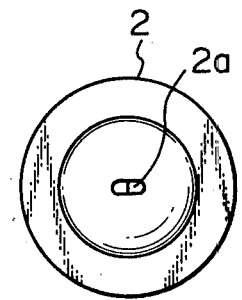
FIG. 3 is a bottom view of the end cap of FIG. 2.
Figure 4:
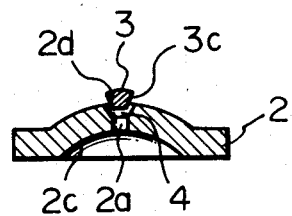
FIG. 4 is a sectional view taken along line IV—IV in FIG. 2.
Figure 5:
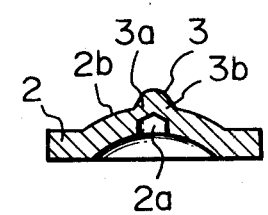
FIG. 5 is a sectional view taken along line V—V in FIG. 2.

As shown in FIGS. 1-5, a projecting portion 3 is formed on an end cap 2 of a metal container 1 according to the invention. Preferably, the metal container 1 is a housing of a shock absorber or a gas spring. A gas introducing passage 4 is formed to extend through the wall of the end cap 2. The projecting portion 3 has fractured side surfaces 3c and 3c and the dimension of which in the direction transverse to the side surfaces 3c and 3c increases in the direction outwards of the container 1, whereby the cross-section thereof as viewed in FIG. 4 has an inverted truncated cone like shape.

Now, description will be made with reference to a die 5 and a punch 6 for forming the projecting portion 3.

Figure 6:
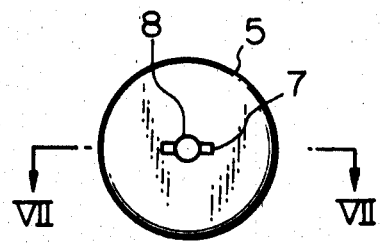
FIG. 6 is a top view of a die for forming a projecting portion according to the invention.
Figure 7:
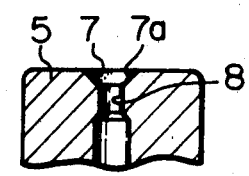
FIG. 7 is a partial sectional view taken along line VII—VII in FIG. 6.

As shown in FIGS. 6 and 7, a sidewisely extending groove 7 is formed in the upper surface of the die 5, and a circular opening 8 having the diameter larger than the width of the groove 7 is formed in the central portion of the groove 7. The bottom surface 7a of the groove 7 inclines toward the opening 8, and the groove 7 and the opening 8 are connected with one another.

Figure 8:
FIG. 8 is a side view of a punch.
Figure 9:
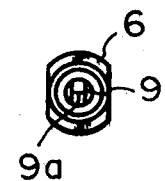
FIG. 9 is a bottom view of the punch of FIG. 8.

While, as shown in FIGS. 8 and 9, the tip end portion 9 of the punch 6 has the cross-section corresponding to the groove 7, with the distal end 9a having a triangular shape as viewed in FIG. 8.

The machining operation is performed as follows.

The cap 2 is mounted on the die 5 with the outer surface 2b of the cap 2 engaging with the upper surface of the die 5. The punch 6 is mounted on a punch holder of a press (not shown). A pressing force is applied on the punch 6, whereby a sheared surface 2a having a configuration corresponding to the tip end portion 9 of the punch 6 is formed in the wall of the cap 2. When the sheared surface 2a is formed by a predetermined amount, a part of the wall of the cap 2 fractures along side surfaces 3c and 3c thereby forming a projecting portion 3 which projects outwards of the outer surface 2b of the cap 2. It will be noted that the maximum diameter of the projecting portion 3 corresponds to the inner diameter of the opening 8 of the die 5, that fractured surfaces 2d and 2d corresponding to the side surfaces 3c and 3c are formed adjacent to the sheared surface 2a, that the sheared surface 2a extends from the inner surface 2c of the cap 2 to the midway in the direction of the thickness of the wall of the cap 2, and that the fractured side surfaces 3c are tapered in the direction towards the inner surface 2c of the cap 2. The gas introducing passage 4 extends along the surfaces 2a, 2d and 3c. The projecting portion 3 is connected to the cap 2 through opposite side portions 3a and 3b, and the outer configuration of which is defined by the bottom of the groove 7 in the die 5. The dimension of the projecting portion in the direction transverse to the side surfaces 3c or in the horizontal direction as viewed in FIG. 4 increases in the direction outwards of the cap 2.

The gas filling operation will now be described. The container 1 having the gas introducing passage 4 in the cap 2 as described heretofore is positioned, as shown in FIG. 1, at least partly in a closed chamber 10 with the passage 4 being exposed in the chamber 10. The chamber 10 is sealed by a seal member 11. Pressurized gas is introduced into the chamber 10 from a source of pressurized gas 13 by opening a valve 12, whereby pressurized gas introduced into the chamber 10 is supplied into the container 1 through the passage 4. After supplying a predetermined amount of pressurized gas into the container 1, an electrode 14 is moved downward in FIG. 1 to deform the projecting portion 3 so that the side surfaces 3c of the projecting portion 3 tightly engage with the fractured surfaces 2d of the cap 2 to close the passage 4. Thereafter, the projecting portion 3 is welded to the remaining portion of the cap 2, preferably by a resistance welding process.

As described heretofore, the gas filling method according to the present invention comprises the steps of forming a sheared portion in a part of the wall of the container, and deforming outwardly a wall portion adjacent to the sheared portion so as to form a projecting portion which has a fractured side surface and the dimension of which in the direction transverse to the fractured side surface increases in the direction outwards of the container, whereby a gas introducing passage is formed along the sheared surface and the fractured surface. The projecting portion can effectively act as a plug for closing the gas introducing passage since the projecting portion has the cross-section tapering in the inward direction. Further, it is possible to omit the machining operation for removing burrs or the like as compared with the prior art method, and to omit any separate plug for closing the gas introducing passage.

What is claimed is:

1. A metal container comprising a sheared portion in a part of the wall thereof, a projecting portion formed adjacent to the sheared portion and outwardly projecting from the wall of the container, said projecting portion having a fractured side surface and the dimension of said projecting portion in the direction transverse to the side surface increasing in the direction outwards of the container, and a gas introducing passage defined by the sheared portion and the projecting portion and extending through the wall of the container.

2. A metal container as set forth in claim 1 wherein said sheared portion extends from the inner periphery of the wall of the container to the midway in the direction of the thickness of the wall.

3. A metal container as set forth in claim 2 wherein said sheared portion is connected with the fractured side surface of the projecting portion.

* * * * *